United States Patent [19]
Morrill

[11] 3,773,285
[45] Nov. 20, 1973

[54] FLEXIBLE MACHINE MOUNTING

[76] Inventor: Wayne J. Morrill, King and Hamsher Sts., Garrett, Ind. 45738

[22] Filed: Feb. 18, 1972

[21] Appl. No.: 227,411

Related U.S. Application Data

[63] Continuation-in-part of Ser. No. 875,923, Nov. 12, 1969, abandoned.

[52] U.S. Cl.................. 248/15, 248/358 R, 416/500
[51] Int. Cl............................................. F16f 15/04
[58] Field of Search.............. 248/15, 26, 18, 358 R; 416/244, 500; 417/363; 62/295

[56] References Cited
UNITED STATES PATENTS

| | | | |
|---|---|---|---|
| 3,317,124 | 5/1967 | Morrill | 417/363 |
| 2,580,313 | 12/1951 | Morrill | 248/26 |
| 2,073,868 | 3/1937 | Fladeland | 416/247 X |
| 3,584,469 | 11/1969 | Butts | 62/295 |
| 2,926,837 | 3/1960 | Coe | 417/363 |
| 2,621,850 | 12/1952 | Firth | 417/247 UX |

FOREIGN PATENTS OR APPLICATIONS

| | | | |
|---|---|---|---|
| 729,484 | 12/1942 | Germany | 417/363 |
| 713,460 | 8/1954 | Great Britain | 417/363 |

Primary Examiner—J. Franklin Foss
Attorney—George V. Woodling et al.

[57] ABSTRACT

A flexible machine mounting is shown for a dynamo-electric machine which is subject to rotary vibration such as an electric motor energized at 60 Hz and subject to 120 Hz rotary vibration due to the magnetic pulsations. The machine is mounted by rigid links which have collars on opposite ends to surround elastic sleeves in turn surrounding pin members with the inner set of pin members fixed by spokes to the machine and the outer set of pin members fixed by rods to the supporting frame. The two flexible fastening means at each end of the rigid links permits the motor or machine to have a high degree of rotary freedom to permit vibration thereof without transmitting the vibration and noise to the supporting frame. The foregoing abstract is merely a resume of one general application, is not a complete discussion of all principles of operation or applications, and is not to be construed as a limitation on the scope of the claimed subject matter.

24 Claims, 13 Drawing Figures

PATENTED NOV 20 1973 3,773,285
SHEET 1 OF 3
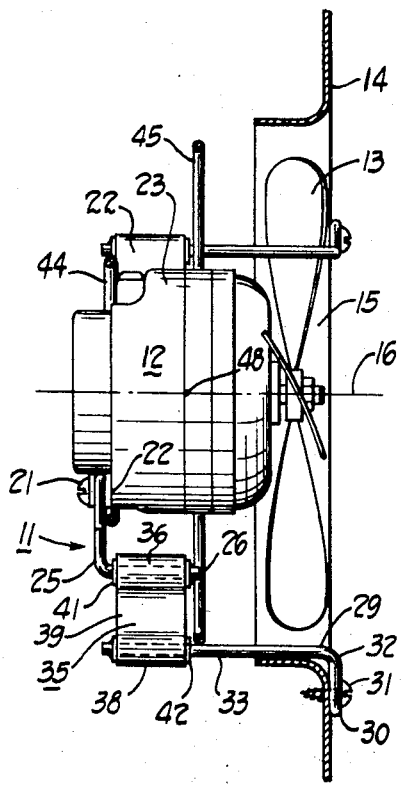
Fig. 1
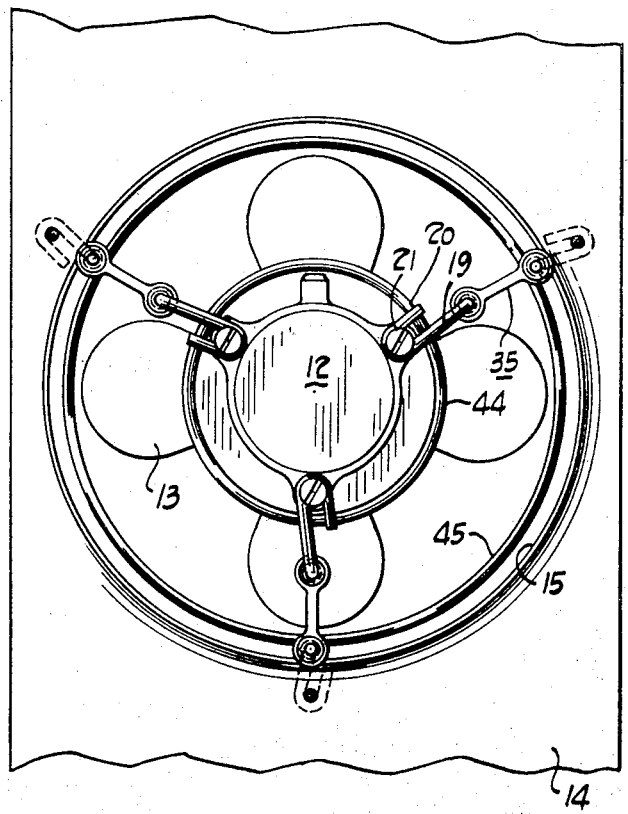
Fig. 2
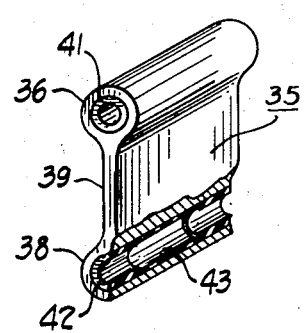
Fig. 3
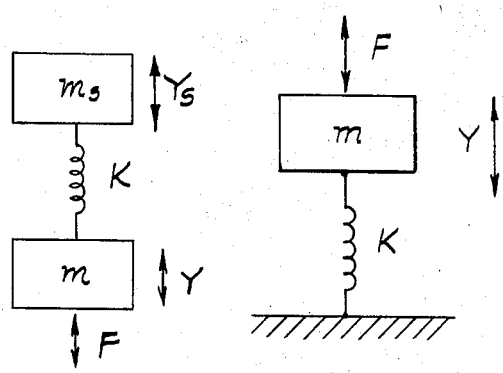
Fig. 12
Fig. 6

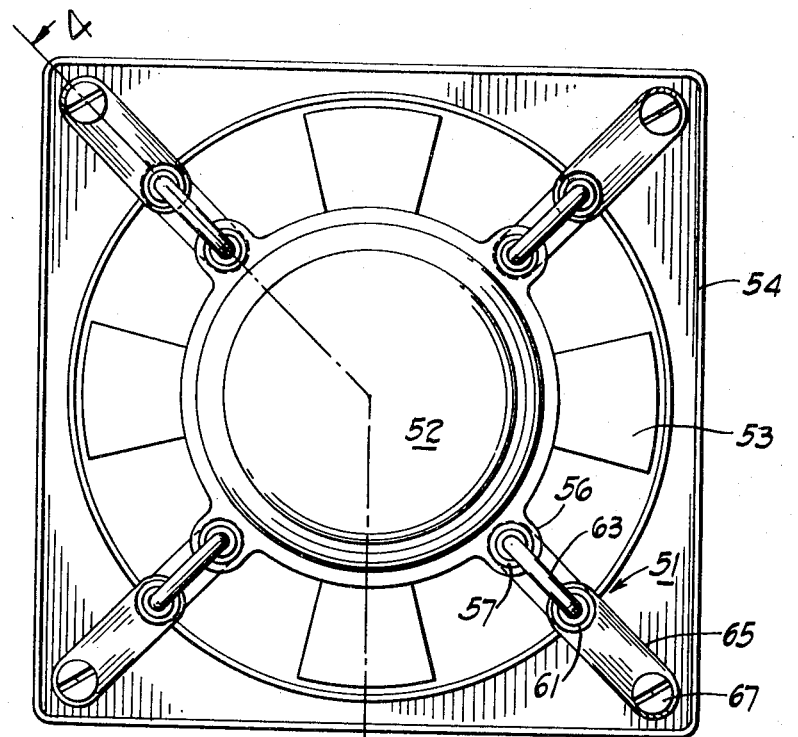
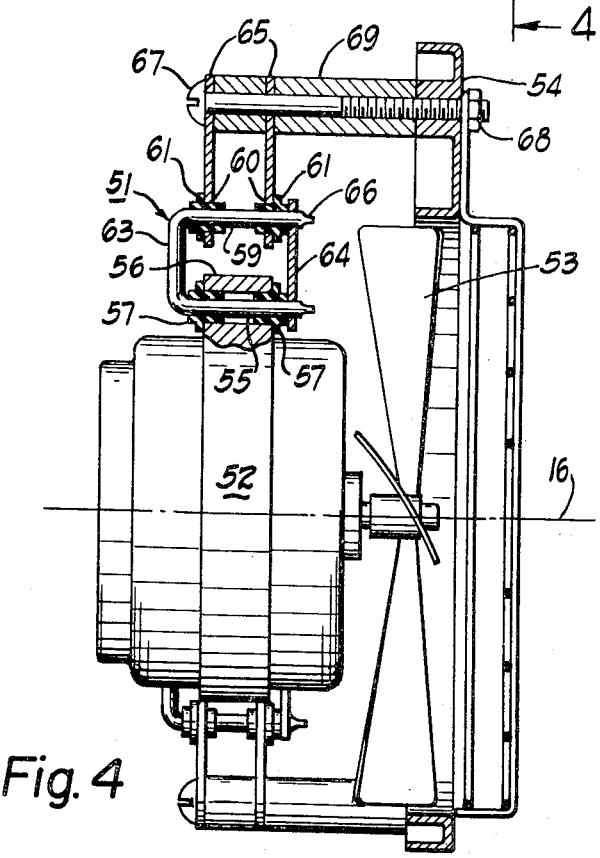
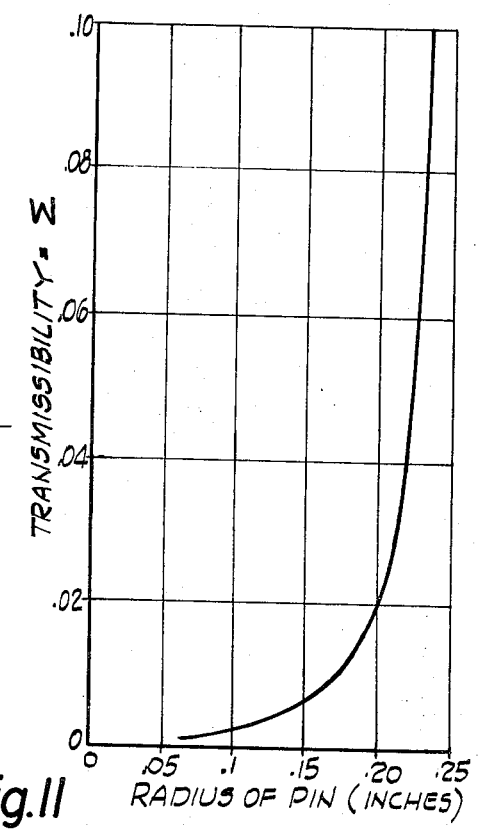
Fig. 5
Fig. 4
Fig. 11

FLEXIBLE MACHINE MOUNTING

This application is a continuation-in-part of my prior application, Ser. No. 875,923, filed Nov. 12, 1969 now abandoned.

BACKGROUND OF THE INVENTION

A very common electric motor mounting to minimize rotary vibration being transferred to the supporting frame is one wherein two annular rubber or elastic rings are mounted concentrically to the center line of the motor shaft, one on each end of the motor, and of relatively small diameter compared to the motor diameter. This permits the motor to vibrate in rotation. In certain motor applications the motor must be supported from only one end because a fan or the like is closely attached to the rotating shaft on the other end, or because of the bearing construction within the motor there is no stationary part of the motor housing at both ends of such housing. Such elastic mounting of a motor being supported at only one end has been quite difficult and one wherein a considerable amount of vibration and noise have been transmitted to the supporting panel because insufficient mounting vibration isolation has been provided. Where the motor is supported from only one end it was previously thought that such motor had to be rather rigidly supported in order to prevent droop of the motor. This was especially true where the motor was driving a fan with the fan inside an aperture of a supporting panel and any droop might cause the fan blade to strike the edge of the aperture. With such a rigid mounting the vibration isolation was very minimal with the result that the noise transmitted to the panel was often excessive and this was often exaggerated or amplified by the panel if it were a thin sheet metal panel as is so often the case in ventilator fans, exhaust fans, window fans, and the like.

A partial solution to this problem was disclosed in my prior U.S. Pat. No. 2,580,313 wherein a motor was suspended from one end by a plurality of arms without motor droop and with a reduction of noise transmitted through the arms to a rigid mounting. However, there was still a component of the rotational motor vibration which was translated along the arms to a main support member, because the arms 11 of my U.S. Pat. No. 2,580,313 had to be made large enough not to bend appreciably under the weight of the motor. The diameter of the arms 11 was too large to obtain much rotary flexibility from the sleeve 31 as needed for effective noise isolation.

One satisfactory solution was in my prior U.S. Pat. No. 3,317,124 which utilized flexible links which were resilient in a lateral direction; namely, a direction circumferential of the motor. These flexible links permitted the motor to have a high degree of rotational vibration without transmitting such vibration to the supporting frame. Such flexible links were made from rubber, for example, with strands of glass fibers embedded therein and wound in a special way so that the fibers crossed in an x-shape to make the link strong in a radial direction, as installed in a motor mounting, yet flexible laterally of the link. Such flexible links were consequently expensive to manufacture.

Accordingly an object of the invention is to provide a flexible machine mounting which isolates the vibration yet is inexpensive to manufacture.

Another object of the invention is to provide a flexible machine mounting wherein rigid links are used in a generally radial direction of the motor and with flexibility at pivotal connections to permit the motor to vibrate in a rotational direction.

Another object of the invention is to provide a flexible machine mounting wherein only rotational vibration is translated to supporting members.

Another object of the invention is to provide a rotationally flexible mounting wherein a minimum of rotational vibration is transmitted to supporting members without causing any new modes of vibration.

Another object of the invention is to provide a vibration isolating mounting which employs simple stampings and wires or rods bent into simple shapes for economical manufacture.

SUMMARY OF THE INVENTION

The invention may be incorporated in a mounting for a dynamoelectric machine having rotary vibration, said mounting comprising, in combination, a frame having an axis, a plurality of first pin members extending substantially parallel to and spaced around said axis, a plurlaity of first support members each for a respective first pin member, first flexible connecting means between said first members, said plurality of first support members defining support wall means engaging said first flexible connecting means to support same, a plurality of second pin members extending substantially parallel to and spaced around said axis, a plurality of second support members each for a respective second pin member, second flexible connecting means between said second members, said plurality of second support members defining support wall means engaging said second flexible connecting means to support same, a plurality of substantially rigid links one each interconnecting one of said first and one of said second members and extending generally radially, first fastening means fastening the other of said first members to said machine, and second fastening means fastening the other of said second members to said frame.

BRIEF DESCRIPTION OF THE DRAWINGS

FIG. 1 is a side elevational view of a machine mounting incorporating the invention with a section taken through the supporting frame;

FIG. 2 is a rear view of the machine mounting of FIG. 1;

FIG. 3 is an isometric view of the rigid link separate from the mounting;

FIG. 4 is a sectional view of a modification on line 4—4 of FIG. 5;

FIG. 5 is a rear view of the modification;

FIG. 6 illustrates a forced oscillating system;

FIG. 11 is a graph of performance characteristics.

FIG. 12 illustrates a forced oscillating system.

DESCRIPTION OF THE PREFERRED EMBODIMENT

Figure 7A:
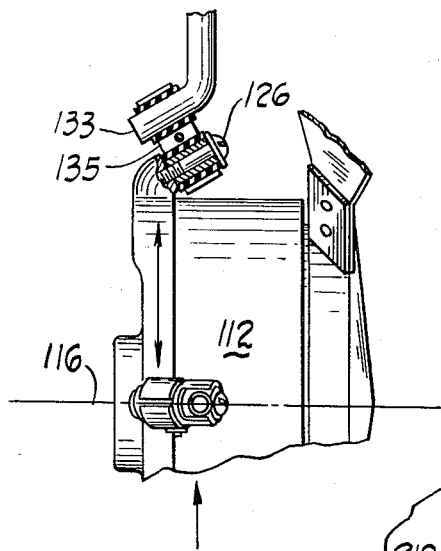
FIG. 7A illustrates my prior art motor mounting in a first position of motor vibration.

The FIGS. 1–3 illustrate a flexible machine mounting 11 which is illustrated as being used with an electric motor 12 as a type of dynamoelectric machine. This motor 12 is shown as a fan motor having fan blades 13 and is used with a supporting frame 14 in this case a thin sheet metal panel. The fan blades 13 are disposed coaxially within a fan aperture 15 which has an axis 16 and the motor 12 is held by this mounting 11 to be substantially coaxial with this aperture axis 16.

The mounting 11 includes a plurality of spokes 19 in this case shown as three in number. The spokes have an inner end bent into a U-shape 20 and are fixed by machine screws 21 to ears 22 which are a part of the casting of the housing 23 of the motor 12. These three spokes 19 extend generally radially and have a right angle bend at 25 so that the outer end of each spoke forms a first pin member 26 disposed generally parallel to the axis 16 and symmetrically spaced thereabout and equidistant from this axis 16.

A plurality of substantially rigid rods 29 have the outer ends thereof bent into a U-shape 30 and fastened with screws 31 to the supporting frame or panel 14. A right angle bend 32 in each rod establishes the inner ends of each as a second pin member 33 substantially parallel to the axis 16 and substantially symmetrically spaced around this axis and equidistant from the axis. The number of first pin members 26 equals the number of second pin members 33, and they are disposed in pairs as shown in FIG. 2.

A plurality of rigid links 35 are provided, in this case three in number. Each link includes a first collar member 36, a second collar member 38, and an interconnecting web 39. First and second elastic sleeves 41 and 42 are provided within the first and second collar member 36 and 38, respectively. The first elastic sleeve 41 flexibly interconnects the first collar member 36 and the first pin member 26 by substantially completely surrounding the first pin member 26 and filling the remaining space inside the first collar member 36. The second elastic sleeve 42 is mounted in a similar manner inside the second collar member 38. As shown in FIG. 3 each collar member 36 and 38 circumscribes at least the outer 180 degress, relative to the radial length of the link 35, of each of the respective pin members 26 and 33. Preferably the collar members 36 and 38 completely or almost completely envelopes the elastic sleeves 41 and 42 to contain such sleeves. A first ring 44 is substantially concentric with the axis 16 and is fixedly attached as by welding to the three spokes 19. This adds structural stiffness to the mounting in a direction perpendicular to the axis 16. A second ring 45 is fixedly attached as by welding to the three rigid rods 29 to add structural stiffness to the mounting in a direction perpendicular to the axis 16. The rings 44 and 45 also serve as a fan guard.

The first and second pin members 26 and 33 are illustrated as being small in diameter in comparison with the distance between the axis 16 and the first pin member 26. The diameters of the first and second pin members 26 and 33 are not arbitrary but must be less than 10 percent of the distance between the first pin member 26 and the motor axis 16 in order to afford sufficient flexibility to rotary vibrations of the motor 12 about the axis 16. If the rotary vibration of the motor 12 encounters resistance in the form of insufficient rotary flexibility within the mounting or if the rotary vibrations of the motor are translated into an axial component along a supporting axis, the vibration of the motor 12 will be transferred to the main support 14 which may result in an amplification thereof.

The transfer of the vibrations of the motor 12 to the supporting frame 14 can be analyzed mathematically. If a mass $m$ is supported by means of a spring from a support of assumed infinite mass as shown in FIG. 6, a sinusoidally alternating force of amplitude F will produce a vertical movement y of the mass such that:

$$y(K - m\omega^2) = F \quad (1)$$

$$y = F/(K - m\omega^2)$$

where
$F$ = amplitude of alternating force
$K$ = spring constant
$\omega = 2\pi f$
$m$ = value of supported mass
$y$ = amplitude of vibration of $m$ The force $F_b$ which will be transmitted through the spring to the support is equal to the product of the displacement $y$ and the spring constant $K$.

$$F_b = Ky = (KF)/(K - m\omega^2) \quad (2)$$

The transmissibility $\epsilon$ of any elastic mounting system is defined as the ratio of the force transmitted with the elasticity, divided by the force transmitted without the elasticity. It is:

$$\epsilon = F_b/F = (KF)/(K - m\omega^2) \div F = (K)/(K - m\omega^2) \quad (3)$$

The natural frequency $f_c$ of the mass $m$ supported by the spring having a constant K can be shown to be:

$$f_c = 1/2\pi \sqrt{K/m} \quad (4)$$

and it follows that:

$$\omega_c = 2\pi f_c = \sqrt{K/m} \quad (5)$$

also that:

$$\omega_c^2 = K/m \quad (6)$$

If the numerator and denominator of Equation 3 be divided by $m$, then:

$$\epsilon = [(K/m)/(K/m) - \omega^2] \quad (7)$$

Substituting (6) in (7) gives:

$$\epsilon = [\omega_c^2/(\omega_c^2 - \omega^2)] = [f_c^2/(f_c^2 - f^2)] \quad (8)$$

If $f/f_c = z$ then (8) may be written:

$$\epsilon = 1/(1 - z^2) \qquad (9)$$

Regardless of the sign of (9) $\epsilon$ is always counted as positive.

To obtain the desired low value of transmissibility $\epsilon$, Equation (9) indicates that the value of $z$ must be made large. Since the exciting frequency $f$ is determined by the motor frequency, $z$ can only be made large by lowering the natural frequency $f_c$ of the elastic mounting. This can be accomplished by either making the spring very flexible, or making the mass $m$ of the motor 12 very great as indicated by equation (4). Making the motor massive is impractical and costly and the problem must be solved by making the spring flexible yet furnishing adequate support to prevent droop of the motor 12.

While the above result was restricted to a linear system for ease in presentation, the procedure applies as well to torsional vibration if Torque T is substituted for Force, rotary movement $\theta$ is substituted for $y$, $K_R$ the "referred" elastic constant of rotational shear is substituted for K and moment of inertia I is substituted for $m$.

When the motor 12 vibrates in a rotary fashion, the pin 26 and the link 35 turn with respect to each other and the elastic sleeve 41 is placed in shear and may be thought to act as a frictionless bearing in parallel with a rotary spring.

It can be shown that for a small rotational displacement $\theta$ the torque between the pin 26 and the link 35 will be:

$$T = \frac{4\pi L G \theta}{\left(\frac{1}{r^2} - \frac{1}{R^2}\right)} \qquad (10).$$

R = Outside radius of elastic sleeve 41
r = Inside radius of elastic sleeve 41
G = Shear modulus of the elastic sleeve 41
$\theta$ = Angle of rotary deflection
L = Length of elastic sleeve The spring constant of the elastic sleeve 41 is:

$$K_R = \frac{T}{\theta} = \frac{4\pi L G}{\left(\frac{1}{r^2} - \frac{1}{R^2}\right)} \qquad (11).$$

A study of Equation (11) shows that the spring constant $K_R$ of the elastic sleeves can be made smaller in one of the following ways:

By making the length of the sleeves shorter,
By reducing the elastic modules G of the rubber (making it softer),
By increasing the outside radius of the sleeves R,
By reducing the inside radius of the rubber $r$.

If the length of the sleeves is made too short, the system becomes unable to support the weight of the motor adequately or it may become unstable in directions which are undesirable.

The characteristics of available elastic rubber materials dictate that a hardness of between 40 and 50 durometer is the minimum practicable for a reasonable life of the rubber sleeve. Since the art is already using this hardness, no helpful modification can be made.

A considerable increase in R is not only costly but leads to instability in undesirable directions and takes up valuable space. It also reduces K relatively slowly.

The most effective and most desirable way of reducing the spring constant $K_R$ is by reducing the pin diameter. To reduce the pin diameter while still maintaining adequate strength requires that the pins be short in length. It is also helpful in maintaining the strength of the pins to harden them and to enlarge their diameter where they do not pass through a rubber sleeve and to support the pins from both ends when possible.

The moment of inertia $I_M$ of the motor 12 may be approximated by:

$$I_M = C D_M^4 L_M \qquad (12)$$

C = density
$D_M$ = Diameter of stator
$L_M$ = Length of stator

As the diameter $D_M$ of the motor becomes small the moment of inertia $I_M$ becomes exceedingly small and requires that the spring constant of the elastic sleeve be substantially reduced limiting the diameter of the pin members. The pin members must be limited to a diameter of less than 10 percent of the distance from the first pin member 26 to the axis 16. My prior U.S. Pat. No. 2,580,313 made use of an existing supporting structure and applied one conventional rubber motor mounting ring to support the motor while additional steadying links and rubber sleeves were used to prevent droop. Because the rubber tubes 11 supported the entire overhung weight of the motor, not only in service but also during shipment, the tubes were required to be relatively large in diameter to avoid droop of the motor and to avoid the tubes bending under the overhung load of the motor. Because of the large diameter of the tubes, the inside diameter of the rubber steadying sleeves 31 was of necessity large and for a small or a light motor or one which is mounted to a relatively flimsy supporting case such as a sheet metal housing of a unit heater, the large diameter rubber sleeves have been found to be too stiff as regards rotational flexibility to produce a low transmissibility $\epsilon$. To explain the significance of a mechanically flimsy motor support we must consider the assumptions which were used in setting up Equation (1) of this application.

In Equation (1) it was assumed that the vibrating mass was supported by means of a spring from a rigid support. The assumption of rigidity of the support is quite well met by a window fan mounted in a window of a house because the fan case normally rests on the window sill and the movable window is normally closed on the top of the fan case to prevent air leakage. In addition there are usually two side panels which are fastened solidly to the fan case and also fastened to the sides of the window to make the fan secure in the window opening and also to prevent air leakage at the sides of the fan case. Under such conditions the window frame and the wall of the house itself add to the rigidity of the motor support. In a manufactured device such as a unit heater, which is normally supported in free air from supporting rods or brackets, there is no additional stiff or massive member to reinforce the sheet metal case of the unit heater and the conditions of vibration are more nearly those of a vibrating system consisting of two masses joined by a spring and floating freely in space. The motor mass constitutes one of the two masses and the sheet metal to which the motor is attached constitutes the other mass. Equation (1) assumed that the support was perfectly rigid (which no support ever really is), and the following equations assume that the support is perfectly flexible (which no support ever really is) but this is done in order to generalize and in order to show why still greater rotational flexibility is required to produce quietness in new applications such as space heaters and the like.

FIG. 12 illustrates two freely floating masses joined by a spring. In FIG. 12 the mass of the motor support is represented by $M_s$ and the mass of the motor stator is represented by $M$. The force applied to $M$ is:

$$Y(k - M\omega^2) - Y_s K = F, \quad (13)$$

where $Y$ is amplitude of movement of the motor stator. The force applied to $M_s$ is:

$$Y_s(K - M_s\omega^2) - YK = 0 \quad (14)$$

Solving the equations (13) and (14) for $Y_s$, the amplitude of movement of the motor support is:

$$Y_s = [FK/M\, M_s\omega^4 - (M + M_s)\, K\omega^2] \quad (15)$$

If $K$ were made very large (a spring so stiff that $M_s$ and $M$ were rigidly joined together) $Y_s$ would become:

$$Y_s' = [F/-(M + M_s)\omega^2] \quad (16)$$

Since the transmissibility $\epsilon$ is expressed as the ratio of $Y_s$ with the elasticity to $Y_s'$ without the elasticity:

$$\epsilon = [FK/M\, M_s\omega^4 - (M+M_s)K\omega^2] \div [F/-(M+M_s)\omega^2] \quad (17)$$

$$\epsilon = \frac{-K(M+M_s)}{MM_s\omega^2 - (M+M_s)K} = \frac{1}{1 - \frac{MM_s\omega^2}{K(M+M_s)}} \quad (18)$$

If the value of $M_s$ is made very large (18) reduces to:

$$\epsilon = [1/1 - (M/K)\,\omega^2] \quad (19)$$

which is the same as (7).

If, on the other hand, $M_s$ becomes very small in comparison with $M$, the mass of the motor stator $\epsilon$ becomes:

$$\epsilon = [1/1 - (M_s\omega^2/K)] \quad (20)$$

Under this condition, $K$ must be made very small if the transmissibility $\epsilon$ is to become a small number.

As has been previously stated, the best way to make $K$ a small number in the rotary vibrating system comprising the disclosed motor mounting is to make the pins inside the elastic sleeves small in diameter.

FIGS. 1 and 2 illustrate that the structure of the present application uses pins located with the axes thereof parallel to the motor axis 16. The fact that the pin members 26 and 33 are parallel to the axis 16 of the motor 12 insures that only a rotational component of the motor 12 will be applied to pin 33 parallel to the pin axis and thus the rotational component of the motor 12 will not be transformed into an axial movement along the axis of the second pin member 33 to the frame 14. Thus the only movement applied to the link 35 is a rotational movement about the axis of the first pin member 26.

Figure 7B:
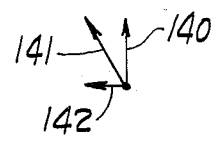
FIG. 7B illustrates the same motor mounting in a second position of motor vibration.

In my prior art U.S. Pat. No. 2,580,313 as shown in FIGS. 7A and 7B, the support 133 was not parallel to the motor axis 116 and thus a portion of the rotary motion of the motor 112 was transformed into an axial motion along the support 133 to vibrate a frame to which the support 133 is connected. FIG. 7A illustrates the second support member 133, the link 135 and a first support member 126. The link 135 is oriented approximately 30° relative to the axis of the motor 116. FIG. 7A illustrates the motor 112 as being in a first rotational position wherein the first and second support members 126 and 133 are substantially in the same vertical plane. Since the motor 112 conisitutes a massive structure, it is assumed that the inertia thereof tends to keep the motor in the same position in the left to right direction as shown in FIG. 7A and 7B. FIG. 7B illustrates the same motor in a different rotational position, about axis 116 in which case the first and second support members 126 and 133 are no longer within the same vertical plane but the support member 126 is shown in front of the support member 133. The rotational motion of the motor 112 has been transformed through the link 135 into a translated motion of the second support member 133 wherein the pin member in FIG. 7B is shown displaced to the right relative to the corresponding support member shown in FIG. 7A. Thus, the rotational motion of the motor 112 has been transformed into a linear motion of the support 133.

The left-right movement of the support member 133 will cause vibration in the main frame to which the support is attached and will increase the noise of operation.

The vector diagram of FIG. 7B illustrates the pertinent vectors. As the motor rotationally vibrates, this is motion into and out of the plane of the paper of FIG. 7B at the pin 126. The direction of such vibration has a vector component 141. This vector further may be considered as having a radial component 140 and an axial component 142. Because the mass of the motor 13 is much larger than that of the spoke 133, this axial vibration component 142 causes the spoke to vibrate axially much more than the motor, and such vibration is transmitted to the frame to cause noise. The disadvantage of my prior art U.S. Pat. No. 2,580,313 has been overcome by my present invention and illustrated in FIG. 1. In order to isolate the supporting frame 14 from the rotary vibrations of the motor 12, it is necessary that the first and second pin members 26 and 33 be substantially parallel to one another and be substantially parallel to the axis 16 of the motor 12. In my prior art patent, the axes of the supporting members 126 and 133 were parallel to one another but were not parallel to the axis of the motor 112. Accordingly, a component of the rotary motion of the motor 112 was translated into a motion along the axis of the supporting member 133 to the supporting frame.

Figure 8:
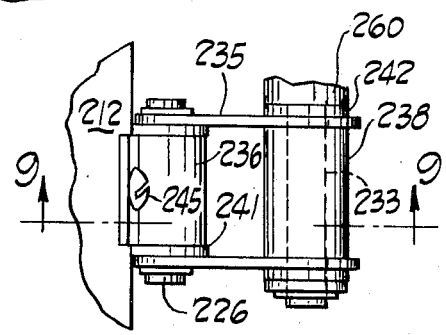
FIG. 8 is a partial side view of a modification of the disclosed invention.
Figure 9:
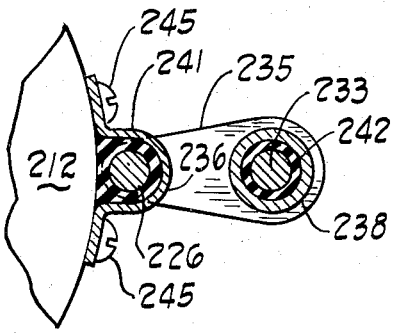
FIG. 9 is a sectional view on line 9—9 of FIG. 8.

FIGS. 8 and 9 illustrate a modification of the inventions shown in FIGS. 1 and 4 including a motor 212 having a first collar member 236 attached thereto by screws 245 which is engaged with a first pin member 226 by a first elastic member 241. The first pin member 226 is connected by a rigid link 235 to a second collar member 238. The second collar member 238 is engaged with a second pin member 233 by a second elastic member 242. The invention shown in FIGS. 8 and 9 is a hybrid between the inventions shown in FIGS. 1 and 4. In FIG. 1 the first and second pin members 26 and 33 were securely fastened to the motor 12 and the main frame 14, respectively, and the first and second collar members 36 and 38 were interconnected by an interconnecting web 39. The invention illustrated in FIG. 4 shows the first and second collar members 56 and 60 rigidly connected to the motor 52 and the main frame 54, respectively, and the first and second pin members 55 and 59 interconnected by a rigid link 63.

FIGS. 8 and 9 illustrate the first collar member 236 connected to the motor 212 and the second pin member 233 has been broken away to indicate that the second pin member 233 is connected to a rigid frame (not shown) in a manner similar to the second pin member 33 in FIG. 1. The first pin member 226 is connected to the second collar member 238 by a rigid link or web 235. Thus the structure shown in FIGS. 8 and 9 is a combination of the structures shown in FIGS. 1 and 4. A further modification is still available wherein the motor 212 would be connected to the first pin member 226 and the second collar member 238 would be connected to an external frame. In such a construction the second pin member 233 would be connected to the first collar member 236 as a part of a rigid link. Such a modification is considered to be within the scope of this invention.

Figure 10:
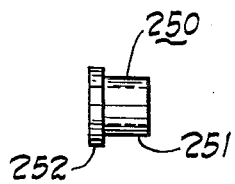
FIG. 10 is an elastic sleeve used in the inventions shown in FIGS. 8 and 9.

FIG. 10 illustrates an elastic member 250 having an inner region 251 and an outer region 252 which is compatible with the invention shown in FIGS. 8 and 9. Two of the elastic members 250 can be inserted into the ends of the collar members 236 and 238 such that the inner region 251 is within the collar member and the outer region 252 is outside the collar member to prevent movement thereof and space the link 235 from shoulder 260 on the pin member 233. In such an arrangement the elastic member will occupy only the outer portions of the interior of the collar member as shown by the elastic member 42 in FIG. 3.

To understand the advantages of my present invention over my prior U.S. Pat. No. 2,580,313, consider the dimensions of the rubber of FIG. 2 of U.S. Pat. No. 2,580,313.

Concentric Rubber Ring At One End of Motor

Outside Diameter OD=1.560"   Outside radius OR=0.780"
Inside Diameter ID=1.210"    Inside radius IR=0.605"
Length L=0.55"

Elastic Sleeves of Droop Resisting Links

ID=0.492"                    IR=0.246"
OD=0.492+2(0.120)=0.732"     OR=0.366"
L=0.797"

Ratio Q of Angular Rotation of Links to Angular Rotation of Motor

Centerline link length = 0.955 inches

Centerline to Motor Distance = 4.14 inches
Ratio Q = 4.14/0.955 = 4.34

From Equation (11):

$$K_R = \frac{T}{\theta} = \frac{4\pi L G}{\left(\frac{1}{r^2} - \frac{1}{R^2}\right)} \times \frac{1}{12} \text{ Pound feet per radian}$$

(21).

For Concentric Rubber Ring:

$$K_R = \frac{4\pi \cdot 55(60)}{12\left[\left(\frac{1}{.605}\right)^2 - \left(\frac{1}{.780}\right)^2\right]}$$

$$= \frac{34.7}{(2.75 - 1.645)} = \frac{34.7}{1.105} = 31.7$$

(22).

For Link Sleeve:

$$K_{LS} = \frac{4\pi \cdot 797(60)}{12\left[\left(\frac{1}{.246}\right)^2 - \left(\frac{1}{.366}\right)^2\right]}$$

$$= \frac{50.2}{[16.5 - 7.46]} = \frac{50.2}{9.04} = 5.56$$

(23).

Because of the ratio of rotations $Q$, one sleeve of the links will be rotated $Q$ times as many radians as the motor is rotated and the torque of that link sleeve will be $Q$ times as great as it would if the sleeve were rotated the same number of radians as the motor. Also, because of the ratio $Q$, the torque due to one link sleeve referred to the motor will be $Q$ times the torque of that sleeve and the spring constant of one link sleeve referred to the motor rotation will be $Q^2$ times the sping constant of that link sleeve. Since there are eight link sleeves, the total referred spring constant of the link sleeves referred to the motor will be:

$$K_{LM} = 8 K_{LS} Q^2 = 8 (5.56)(4.34)^2 = 838.$$

(24)

When the referred spring constant $K_R$ of all the rubber sleeves is added to the spring constant 31.7 of the concentric rubber ring, the total spring constant referred to motor rotation is:

$$K_M = K_R + K_{LM} = 31.7 + 838 = 869.7.$$

(25)

The stator and rear end bell of FIG. 2 of U.S. Pat. No. 2,580,313 were rigidly fastened together and constituted the rotating mass. The stator laminations were seven inches in outside diameter and the rotor was 3.57 inches in diameter with a stator stack length of 1.75 inches and an end bell about 7 3/16 inches in diameter with a thickness of about 3/16 inches. The shell covering the stator was 1/16 inches thick radially. Including the copper winding of the stator and allowing for the lightening of the stator iron because of the stator slots, a solid steel ring 7 1/8 inches OD, 3.57 ID and of 2 inches axial length would have about the same moment of inertia about its axis as would the completed end bell stator assembly.

Choosing cylindrical steel elements of radius $u$ and infinitesimal radial thickness $\Delta u$:

$$\Delta I = (2\pi u L \sigma \Delta u) u^2/g$$

(26)

$L$ in feet $u$ in feet
$g = 32.2$
$\sigma = $ lbs./cu. ft. $= 484$ /cu. ft.

$$I = \int_{u_1}^{u_2} \frac{2\pi u (.1668) 484 u^2}{g} du$$

$$= \frac{2\pi (.1668) 484}{32.2} \int_{u_1}^{u_2} u^3 du$$

$$= 15.66 \left[\frac{u^4}{4}\right]_{u_1}^{u_2} = \frac{1}{4}(15.66)[.297^4 - .157^4]$$

$$= 15.666 \left(\frac{1}{4}\right) .0072 \tag{27}$$

$$I = 0.0282 \tag{28}$$

The natural frequency $f_c$ of a body in torsional vibration having a moment of inertia I of 0.0282 and a spring constant $K$ of 869.7 is:

$$f_c = 1/2\pi \ \sqrt{869.7/0.0282} = 0.159 \ \sqrt{3.10 \times 10^4} = 0.159(176) = 28 \tag{29}$$

$$f_c = 28 \text{ cycles per second.} \tag{30}$$

With the above value of $f_c$ the transmissibility is:

$$\epsilon = \frac{1}{1 - \left(\frac{120}{28}\right)^2} = \frac{1}{1 - 18.4} = \frac{1}{17.4} = .0632 \tag{31}$$

A value of $\epsilon$ of 0.0632 is only marginal if the support is really solid. If the support should be light in weight and flimsy, it would be wholly inadequate. Interestingly if two concentric rubber rings could have been used in a standard motor mounting with a rubber ring on each end, such as in U.S. Pat. No. 2,044,385, the natural frequency would have been:

$$f_c = 1/2\pi \ \sqrt{63.4/0.0282} = 1/2\pi \ \sqrt{2245} = 0.159 \ (47.4) = 7.52 \tag{32}$$

With a natural frequency of 7.52 cycles per second and an excitation frequency of 120 cycles per second, the transmissibility would have been:

$$\epsilon = \frac{V}{1 - \left(\frac{120}{7.52}\right)^2} = \frac{1}{253} = .00395, \tag{33}$$

very good.

In a recent application constructed by the inventor of the present invention, the size of the pin through the elastic sleeve 250 as shown in FIG. 10 was 0.25 inches and the outside diameter of each of the two sleeves was 0.50 inches and four links hinged with four sleeves each were used. The links 235 were about the same length as the anti-droop links of the preceding calculation.

The OD of the stator was 5.25 inches and the stator length was 2 inches and the bore was 2.5 inches. Assuming the moment of inertia I of this stator to be the same as for a steel ring of the following dimensions:

OD=5.25"           OR=2.62"           OR=0.21'=$u_2$
ID=2.5"            IR=1.25"           IR=0.104'=$u_1$
L=2.25                                L=0.188'

$$I = 2\pi L\sigma/4g \ [u_2^4 - u_1^4] = (2\pi(0.188)484/4 \times 32.2) \ [(0.21)^2 - (0.104)^2]$$

$$= 4.44 \ [0.001935 - 0.000163] = 4.44 \ [0.001772] \tag{34}$$

$$I = 0.00786. \tag{35}$$

When the motor 212 turns through a central angle of $\theta_s$ radians in FIG. 8, the link rotates around the stationary pin 233 through a greater angle $\theta_o$ if the radial length $R_L$ of the link 235 is less than the radial length $R_M$ from the center of the motor 212 to the moving first pin 226. In fact, this outer angle can be expressed in terms of the central angle of the motor rotation $\theta_s$, thus:

$$\theta_o = R_M/R_L \ \theta_s = W\theta_s \tag{36}$$

where $W = R_M/R_L = 0.234/0.0832 = 2.812$ (36)

The moving pin 226 rotates in the same direction as does the sleeve surrounding pin 233 and by exactly the same angle but since the motor 212 is turning in the opposite direction by the angle $\theta$, the rubber sleeve surrounding pin 226 is subjected to more shear strain because, since the two rotations are in opposite directions and as far as shear in the rubber bushing is concerned, they add. For a stator rotation of $\theta_s$, the total displacement rotationally between the moving pin 226 and the mounting strap 241 which surrounds it is:

$$\theta_I = \theta_o + \theta_s = R_M/R_L \ \theta_s + \theta_s = \theta_s \ (1 + R_M/R_L) = \theta_s(1 + W) \tag{37}$$

There were two rubber grommets in each end of each link of this mounting and each grommet had the form shown in FIG. 10 wherein the outside diameter at 251 is approximately 1/2 inch and the inside diameter 1/4 inch.

While the two elastic sleeves in FIG. 10 were spaced a distance apart axially for reasons of mechanical stability as shown in FIG. 3, both sleeves surrounded the same pin and both were enclosed in the same collar member so for torsional calculation purposes they can be thought of as a single elastic sleeve with a 1/4 inch ID and a 1/2 inch OD. Using a shear modulus $G$ of 60 for 45 durometer rubber, the spring constant of each sleeve was:

$$K_s = \frac{4\pi LG}{12\left(\frac{1}{r^2} - \frac{1}{R^2}\right)} = \frac{4\pi(.5)60}{12\left(\frac{1}{\left(\frac{1}{8}\right)^2} - \frac{1}{\left(\frac{1}{4}\right)^2}\right)} = \frac{4\pi(.5)60}{12(64-16)}$$

$$= \frac{31.5}{48} = .656 \tag{38}$$

$$K_s = 0.656 \tag{39}$$

For the four outer sleeves the spring constant referred to the rotation of the motor about its own axis would be for each sleeve:

$$K_o = 0.656 \ W^2 = 0.656(2.812)^2 = 0.656(8.5) = 5.68 \tag{40}$$

For the total spring constant of all four outer sleeves multiply (40) by four:

$$K_{o4} = 4(4.68) = 22.7 \tag{41}$$

Referring now to the inner sleeves in the links and Equation (37), we can determine the torque produced in one sleeve by a stator rotation of $\theta_s$ radians. It is:

$$T_I = 0.656 \ \theta_s \ (1 + W) \tag{42}$$

The force on a stationary pin 233 (in FIG. 9) corresponding to $T_I$ is equal to $T_I$ divided by the radius of the link in feet:

$$F_{ps} = T_I/R_L = [0.656 \ (1+W)\theta_s/0.0832] = [0.656 \ (1+2.812)\theta_s/0.0832]$$
$$= 30.1 \ \theta_s \ \text{pounds} \tag{43}$$

The torque around the stator axis produced by the reaction force to (43) is equal to the force of (43) times the radius to the stationary pin 233 which is $R_M + R_L$:

$$T_M = F_{ps} \ (R_L + R_M) = 30.1 \ \theta_s \ (.0832 + .234)$$
$$= 30.1(.3172)\theta_s \text{ for one link.} \tag{44}$$

The total torque around the stator axis due to four links is four times $T_M$:

$$T_{M4} = 4 \times 30.1 \ (.3172)\theta_s = 38.4 \tag{45}$$

The spring constant corresponding to (45) is:

$$K_{M4} = T_{M4} \div \theta_s = 38.4. \tag{46}$$

The total spring constant for all the rubber sleeves of all the links is equal to (41) plus (46):

$$K_{ML} = K_{o4} + K_{M4} = 22.7 + 38.4 = 61.1 \tag{47}$$

The natural frequency for this link mounting is:

$$F_c = 1/2\pi \ \sqrt{K_{ML}/I} = 1/2\pi \ \sqrt{61.1/0.00786} = 1/2\pi \ (88) = 14.0 \tag{48}$$

The transmissibility corresponding to $F_c$ of 14.0 when the motor is excited by 60 Hertz electrical input is:

$$\epsilon = \frac{1}{1 - \left(\frac{120}{14.0}\right)^2} = \frac{1}{1-(8.56)^2} = \frac{1}{72.2} = .0138 \tag{49}$$

While the transmissibility as shown by (49) is approximately four times as great as the transmissibility of the two concentric rubber ring mounting, equation 33, it is only about one-fourth as great as that of the larger stator of U.S. Pat. No. 2,580,313, equation 31. By actual tests in a unit heater installation the performance of the mounting was very good and no 120 cycle noise was heard with the ear against the metal panel of the heater. If the moment of inertia of this 5.25 inches diameter stator had been as great as the moment of inertia of the 7.125 inches stator, the transmissibility of the mounting would have been slightly better than the transmissibility of a standard rubber ring mounting.

FIG. 11 illustrates a curve of the radius of the pin member 26 versus the transmissibility of the noise or vibration to the housing. This curve is plotted for a motor stator with four links in which each link has two elastic sleeves in each end with a sleeve length of 0.25 inches and with an outside radius of the elastic sleeve 42 at a constant value of 0.25 inches. This could be as shown in FIGS. 9 and 10, for example. The rubber hardness for the sleeves is assumed to be 45 durometer having a shear modulus G of 60, in inch-pound units. The moment of inertia of the stator and the end bell fastened to it is 0.0282 in pound feet squared units. The radius from the centerline of the motor to the centerline of the inner pin 226 of the link mounting is 0.234 feet. The radial distance between the two pins of the link is 0.0832 feet. The radius of the pin member such as pin 26 or 226 is varied and the transmissibility has been calculated by formulas similar to formulas 34–39 and the result plotted in FIG. 11. If we presume that we can make the moment of inertia of the smaller stator equal to that of the larger stator for comparison purposes, the relative effectiveness of the two types of flexibility are more fairly shown. Using this larger moment of inertia so that all three methods of mounting can be compared fairly, FIG. 11 has been plotted. Equation (48) for natural frequency $F_c$ becomes:

$$F_c = 1/2\pi \ \sqrt{K_{ML}/I} = 1/2\pi \ \sqrt{61.1/0.282} = 1/2\pi \ (46.5) = 7.42 \tag{50}$$

$$\epsilon = \frac{1}{1 - \left(\frac{120}{7.42}\right)^2} = \frac{1}{1 - 16.18^2} = \frac{1}{260.2} = .00381 \tag{51}$$

This illustrates the desirability of the pin radius being kept small because in such case the transmissibility of vibration is minimal and the entire mounting is excellent. This low transmissibility of vibration provides an excellent mounting for radii of pins of 0.15 inches and smaller. As shown in FIGS. 9 and 10 the radius is 0.125 inches for an excellent motor mounting. In FIG. 8 the pin 233 is supported in a cantilever manner from a housing, not shown, and if a more rigid mounting is desired, the pin 233 may be supported from both ends. The above calculations indicate that the radius of the pin 226 should be less than 10 percent of the motor axis to first pin distance for good noise isolation. FIG. 11 confirms this fact that the small diameter or small radius of pin 226 does achieve this minimal noise transmissibility.

The radial length of each of the links 35 is in the order of 40 percent of the radial distance from the axis 16 to the first pin members 26 and this establishes the length of these links 35 as relatively short or a mounting which is stiff in all directions transverse to the axis 16 yet permits a high degree of rotary flexibility for the motor 12. The center of gravity of the motor 12 may be at a point 48 which is in a plane normal to the axis 16 which passes through the links 35. The elastic sleeves 41 may be of suitable elastic material such as neoprene, buna N, natural rubber or silicone rubber. The elastic sleeves 41 and 42 may be cemented to one or both of the pin members or collar members and if they are not initially cemented, the natural aging process does inherently tend to attach the elastic sleeve to each the pin members and collar members.

OPERATION

The motor 12 is designed to be energized with alternating current, for example, 60 Hz, and this will establish magnetic pulsations of 120 Hz which tend to rotationally vibrate the motor at this 120 Hz rate. The motor mounting 11 is especially successful in isolating this rotational vibration and not transmitting it to the supporting frame 14. This frame may be a thin sheet metal panel as shown which will readily vibrate and amplify any vibrational noises transmitted to it so it is essential that only a minimum of such vibration be transmitted by the mounting. The mounting 11 is very satisfactory in this respect by the two flexible connecting means between the first members 26 and 36 and between the second members 33 and 38. The elastic sleeves of rubber-like material are employed in shear to this rotational vibration and for this small amount of rotary movement, for exmaple, five degrees at the most, the rubber is very flexible. Conversely the rubber-like material of these sleeves 41 and 42 is disposed in compression for all forces transverse to the axis 16. This makes the mounting very rigid in all of these directions so that there is little droop to the fan and of the motor 12 even though the center of gravity 48 is forward, that is to the right in FIG. 1, of the center line of the links 35. This absence of droop on the motor 12 means that the fan blades 13 will not strike the edges of the aperture 15 nor will they strike the supporting rigid rods 29. as shown in FIG. 3, these sleeves 41 and 42 may be undercut at 43 or the pin, collar and elastic sleeves otherwise shaped to have contact principally at the two ends of the respective sleeve. The ends of the rubber sleeve form the principal resistance to droop because they are far apart whereas the middle of the rubber sleeve does little to prevent droop. In order to keep the rotary flexibility high the amount of rubber which is placed in rotary shear is reduced hence undercutting the middle of the rubber sleeve is beneficial in both of these ways.

With the links 35 having a length approximately 40 percent of the radial distance between the axis 16 and the pin members 26, this is a ratio of length of 2.5 : 1. This means that the link will turn about the outer pin members 33 through an angle 2 ½ times as great as the angular motion of the motor and it will turn through an angle 3 ½ times as great as the motor about the inner pin members 26. Whereas it might be assumed that because of this multiplication of turning, which affects the rotational flexibility of the motor in a second power fashion, the link mounting would not be sufficiently flexible rotationally to be effective. However, it has been found that this mounting is every bit as satisfactory for rotational vibration isolation as that in my prior U.S. Pat. No. 3,317,124 which employed the specially made and laterally flexible links with glass fibers embedded in rubber. It will be noted that the present mounting employs only the rigid links 35 which are easy to manufacture from a simple sheet metal stamping, casting or extrusion and the rods 29 and spokes 19 are made from heavy gauge wire bent into simple shapes. The elastic sleeves may be made simply from short sections of rubber-like hose to be slipped into place between the respective pin member and collar member to assemble the entire mounting 11.

It will be observed that the first pin members 26 are flexibly connected to the first collar members 36 by means of the elastic sleeve 41. Similarly the second pin members 33 are flexibly connected to the second collar members 38 by means of the second elastic sleeve 42. Each of the rigid links interconnects one of the first and one of the second members and extends generally radially. As shown in FIG. 1 each of these rigid links interconnects the two collar members 36 and 38. The spokes 19 are a first fastening means to fasten the other of the first members to the motor 12 and as shown in FIG. 1 these are the first pin members 26 which are fastened to the motor 12. The rods 29 are a second fastening means to fasten the other of the second members to the frame 14 and as shown in FIG. 1 these rods 29 connect the second pin members 33 to this frame.

DESCRIPTION OF MODIFICATION

FIGS. 4 and 5 show a modification of the invention wherein a motor 52 drives a fan 53 and is mounted by a mounting 51 on a frame 54. This mounting 51 includes a plurality of first pin members 55 extending substantially parallel to and symmetrically and equally spaced around the axis 16. A plurality of first collar members 56 are each substantially parallel to and surrounding a respective first pin member 55. These first collar members 56 are formed as ears unitarily cast as a part of the metal housing of the motor 52. A first flexible connecting means 57 is disposed between the first pin and collar members 55 and 56. This flexible connecting means may be two axially separated rubber-like grommets which form elastic compressible sleeve means between the first pivot collar members.

The mounting 51 also includes a plurality of second pin members 59 extending substantially parallel to and symmetrically and equally spaced around the axis 16. A plurality of second collar members 60 are in pairs and each pair is substantially parallel to and surrounding a respective second pin member. These may be circular holes in flat metal stampings 65. Second flexible connecting means 61 are disposed between respective ones of the second members. Again these may be axially separated rubber-like grommets which form elastic compressible sleeves between the second members. A plurality of substantially rigid links 63 are provided, one each interconnecting one of the first members and one of the second members and extending generally radially, as shown in FIG. 5. In this modification of FIGS. 5 and 5, the rigid links are formed from wire or rod bent into a U-shape so that the inner ends of the links 63 form the first pin members 55 and the outer ends of this wire or rod form the second pin members 59. Such wire or rod is stiff enough not to bend out of shape in supporting the weight of the motor and fan. As an added precaution to prevent bending of the link 63, a cross piece 64 has the ends thereof to fit over the ends of the U-shaped link 63 and then these wires ends may be pinched or flattened at 66 to retain the cross piece 64 in position.

First fastening means is provided to fasten the first collar members 56 onto the motor 52 and this is accomplished by the unitary casting of the metal ears on the housing of the motor which are then drilled or otherwise apertured to form the collar members 56. Second fastening means are provided to fasten the second collar members 60 onto the frame 54 and this second fastening means includes the metal stampings positioned as radial links 65 pivotally or preferably fixedly fastened as by bolts 67, nuts 68, and spacers 69 to this frame 54.

In other respects the machine mounting 51 may be similar to that of mounting 11 of the FIGS. 1–3 and the rubber-like sleeves or flexible connecting means 57 and 61 have been found to be very effective in isolating the rotary vibration of the motor 52 from being transmitted to the frame 54.

The FIGS. 1–3 show that only three such rigid links 35 are used, whereas FIGS. 4 and 5 show that four are used. Three is sufficient for mounting the motor 12 or 52, whereas FIGS. 4 and 5 show that in many cases a more compact machine mounting may be achieved by using four such rigid links because the entire machine mounting 51 may be fitted within a square outline which just contains the circular fan aperture.

Motor mountings built according to the present invention have been found to be exceptionally free from transmitting the rotary vibration of the motor to the frame yet have been exceptionally stiff in all directions transverse and parallel to the axis 16 so that this mounting has been found satisfactory not only for horizontal axis mounting, but also for vertical axis mounting. The typical prior art mounting of rubber grommets of small diameter one on each end of the motor housing is satisfactory for horizontal axis mounting but generally is not useable for vertical axis mounting. This stiffness of the present mounting 11 or 51 is caused by the small radial dimension of the rubber-like sleeves which is stressed in compression for all forces transverse and parallel to the axis 16. Because of this thin dimension, the rubber-like material rapidly resists such stress without excessive deflection and accordingly the mounting is quite stiff and hence resists droop of the motor. Some of the most severe stresses transverse and parallel to the axis are encountered by the dropping, throwing and jolting occurring during shipment. The mountings 11 and 51 have been found to resist such stresses so that the fan is not misaligned relative to the fan aperture nor jammed into the fan guard.

If rigid radial (to the axis of rotation) links are attached between a horizontal axis motor and its support by means of rubber "lubricated" hinges, as shown in the preceding two examples, it is possible to obtain a high degree of rotational freedom for the motor for very small angular movements while maintaining a high degree of translational rigidity in a vertical plane passing through the axis of rotation. For very small amplitudes of vibrational rotation of the stator the compression of the rubber in the hinges would be negligible while for large amplitudes or rotational movement the links 35 and 63 would become non-radial in position and large compressional restraining forces would be set up in the rubber tending to resist further rotational movement. Since the normal double line frequency torque vibration of a single phase motor produces a very small amplitude of rotary stator vibration (probably between 0.0001 inch and 0.000001 inch measured at the stator periphery), the rubber "lubricated" links are able to respond with great freedom to the noise producing double frequency vibration because the rubber in the hinges is in shear only for these very small vibrations.

As previously mentioned the elastic sleeves 41, 42, 57 and 61 may or may not be cemented in place. The use of rubber cement, for example, also acts as a lubricant to help slide these elastic members into place. Also when such sleeve and flexible connecting means are cemented in place, then the mechanical stability of the mounting is increased without decreasing the rotational flexibility. This is because when these parts are cemented together, slippage between the elastic members and the inner pins and outer collar members is prevented as the rubber or elastic members deform under the weight of the motor 12. Without this cement there is a tendency for the elastic member to squeeze out at each side and become thinner at the point of high pressure. With the cement the squeezing out is prevented.

The elastic sleeves 41 and 42 and the flexible connecting means 57 and 61 act between an inner pin and an outer collar. Those skilled in the art will readily recognize many ways in which this outer collar or support member may be constructed so long as it is a means to hold the elastic sleeve rigid against translation and against droop yet will leave it free as at present to act as an elastic hinge permitting rotational vibration of the motor 12. Accordingly the collar members 36 and 38 of FIGS. 1, 2 and 3 and the collar members 56 and 60 of FIGS. 4 and 5 are outer or support members which are substantially parallel to and define aperture or support wall means at least partially surrounding a respective pin member.

It is not necessary that the links be equally angularly spaced, but if not, they should be symmetrically spaced at least with respect to a vertical plane containing the axis 16.

Present trends underway to reduce "noise pollution" will cause wide demand for perfection in attaining quietness and applicant knows of no other way than by the present invention of a link mounting to approach such quietness with a long-lived unit-bearing motor.

The present disclosure includes that contained in the appended claims, as well as that of the foregoing description. Although this invention has been described in its preferred form with a certain degree of particular-

What is claimed is:

1. A mounting for a dynamoelectric machine having rotary vibration,
said mounting comprising, in combination,
a frame having an axis,
a plurality of first pin members extending substantially parallel to and spaced around said axis,
a plurality of first support members each for a respective first pin member,
first flexible connecting means between said first members,
said plurality of first support members defining support wall means engaging said first flexible connecting means to support same,
a plurality of second pin members extending substantially parallel to and spaced around said axis,
a plurality of second support members each for a respective second pin member,
second flexible connecting means between said second members,
said plurality of second support members defining support wall means engaging said second flexible connecting means to support same,
a plurality of substantially rigid links one each interconnecting one of said first and one of said second members and extending substantially radially,
first fastening means fastening the other of said first members to said machine,
second fastening means fastening the other of said second members to said frame,
the diameter of the first pin members being sufficiently small to establish the natural frequency of rotary vibration $f_c$ about said axis equal to $1/2\pi \sqrt{K_R/I_M}$, where $K_R$ is the spring constant of said first flexible connecting means, $I_M$ is the moment of inertia of the stator of the dynamoelectric machine, and $f_c$ is less than one-half and preferably less than about one-fifth of the applied frequency of magnetic vibration.

2. A mounting as set forth in claim 1, wherein said first pin members are each paced at substantially the same radial distance from said axis,
each of said second pin members being spaced substantially equally from said axis and at a greater distance from said first pin members.

3. A mounting as set forth in claim 1, wherein said first fastening means includes spokes interconnecting said first pin members and said machine.

4. A mounting as set forth in claim 1, wherein said second fastening means includes relatively rigid rods fastening said second pin members to said frame.

5. A mounting as set forth in claim 4, including a ring substantially normal to said axis and interconnecting said rods.

6. A mounting as set forth in claim 1, wherein each of said rigid links includes a first and a second support member on opposite ends thereof.

7. A mounting as set forth in claim 1, wherein said first fastening means includes a plurality of symmetrically disposed spokes radiating from and fixed to said machine, and a right angle bend in each spoke so that the outer end thereof lies parallel to said axis and constitutes the respective first pin member.

8. A mounting as set forth in claim 1, wherein the radial length of each of said links is in the order of 40 percent of the radial distance from said axis to said first pin members,
and said first pin members being spaced closer to said axis than said second pin members.

9. A mounting as set forth in claim 1, wherein the center of gravity of said machine is in a plane normal to said axis and which plane passes through each of said rigid links.

10. A mounting as set forth in claim 1, wherein said first support members are first collar members defining aperture wall means at least partially surrounding a respective first pin member.

11. A mounting as set forth in claim 1, wherein said second support members are second collar members defining aperture wall means at least partially surrounding a respective second pin member.

12. A mounting as set forth in claim 1, wherein said first and second support members are collar members at least partially surrounding a respective pin member.

13. A mounting as set forth in claim 12, wherein said first and second flexible connecting means includes an elastic sleeve substantially filling the space between the respective pin member and the respective collar member.

14. A mounting as set forth in claim 12, wherein the respective pin member and collar member are substantially coaxial.

15. A mounting as set forth in claim 12, wherein each of said collar members is substantially cylindrical surrounding a respective cylindrical pin member,
and said flexible connecting means are compressible elastic rubber-like members disposed between the pin members and the respective collar members.

16. A mounting as set forth in claim 12, wherein each of said collar members circumscribes at least 180° of the respective pin member.

17. A mounting as set forth in claim 12, wherein each of said rigid links has a rigid connection to one of said first and second collar members.

18. A mounting as set forth in claim 12, wherein each of said rigid links has a rigid connection to one of said first and one of second collar members on opposite radial ends thereof.

19. A mounting as set forth in claim 1, wherein each of said rigid links includes a first and a second pin member on opposite ends thereof.

20. A mounting as set forth in claim 12, wherein each of said rigid links has a rigid connection to one of said first pin and collar members.

21. A rotationally flexible mounting for an electric motor having rotary vibration in the order of 120 Hz when operated at 60 Hz alternating voltage,
said mounting comprising, in combination, a mounting panel having a fan aperture,
three relatively rigid rods extending perpendicularly to said panel and generally symmetrically surrounding said fan aperture in said panel,
three spokes radiating from and fixed to said electric motor in the direction toward said three rods,
a first ring substantially parallel to said panel and interconnecting said three rods to add structural stiffness in a direction perpendicular to the axis of said motor and panel aperture, a second ring substantially parallel to said panel and interconnecting said three spokes to add structural stiffness thereto in a direction perpendicular to said axis, each of said spokes having a right angle bend to have a leg portion substantially parallel to said axis and disposed relatively closely to a respective one of said rods, three rigid radial links, each having two tubular collars and an interconnecting web, a compressible elastic sleeve within each collar of each link and embracing a spoke leg portion and a rod respectively to mount said motor coaxially relative to said fan aperture, the radial length of each of said links being in the order of 40 percent of the radial distance from the motor axis to said leg portions, the center of gravity of said motor lying in a plane normal to said axis which passes through said links, said elastic sleeves being slightly compressed between the link collars and respective leg portion and rod to permit rotational flexibility of the motor and consequent slight oscillation of each link about the respective rod without transmitting any appreciable amount of said rotational vibration to said fan mounting panel.

22. A mounting as set forth in claim 1, wherein each of said pin members has a diameter less than 10 percent of the distance from said axis to said first pin members.

23. A flexible mounting as set forth in claim 21, wherein each of said leg portions of said spokes has a diameter less than 10 percent of the distance from said leg portion to the axis of said motor.

24. A mounting as set forth in claim 1, wherein each of said rigid links interconnects a pin member to a support member.

* * * * *